United States Patent
Liu et al.

(10) Patent No.: US 10,660,046 B2
(45) Date of Patent: May 19, 2020

(54) SYSTEMS AND METHODS FOR NETWORK ADAPTATION SUPPORT IN WIRELESS NETWORK

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US); Hossein Bagheri, Arlington Heights, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/274,484

(22) Filed: May 9, 2014

(65) Prior Publication Data

US 2014/0334320 A1    Nov. 13, 2014

Related U.S. Application Data

(60) Provisional application No. 61/822,181, filed on May 10, 2013.

(51) Int. Cl.
*H04W 52/24* (2009.01)
*H04B 17/318* (2015.01)
(Continued)

(52) U.S. Cl.
CPC ........ *H04W 52/242* (2013.01); *H04B 17/318* (2015.01); *H04L 5/0085* (2013.01);
(Continued)

(58) Field of Classification Search
CPC ... H04W 52/242; H04W 24/10; H04W 48/12; H04W 52/325; H04B 17/318
(Continued)

(56) References Cited

U.S. PATENT DOCUMENTS

| | | | |
|---|---|---|---|
| 9,225,449 B2* | 12/2015 | Heo | H04W 4/70 |
| 2009/0252073 A1* | 10/2009 | Kim | H04W 52/0241 370/311 |

(Continued)

FOREIGN PATENT DOCUMENTS

CN    103039107 A    4/2013

OTHER PUBLICATIONS

3GPP, 3rd Generation Partnership Project; Technical Specification Group Radio Access Network; Small cell enhancements for E-UTRA and E-UTRAN—Physical layer aspects (Release 12), 3GPP TR 36.872 V12.1.0, Dec. 2013, 100 pages.

(Continued)

*Primary Examiner* — Kwang B Yao
*Assistant Examiner* — Syed M Bokhari
(74) *Attorney, Agent, or Firm* — Slater Matsil, LLP

(57) ABSTRACT

Embodiments are provided for implementing network adaptation schemes, including small cell on/off adaptation and transmission power control. In an embodiment method for supporting network adaptation, a network component receives a discovery reference signal (DRS) from a network controller that is in a switch-off transmission mode. The network component then performs measurements according to the DRS, and reports the measurements to a network associated with the network controller. In return, the network component receives a radio resource control (RRC) signaling from the network. The RRC signaling includes configuration information allowing a connection between the network component and the network controller. The network component then connects with the network controller in accordance with the configuration information.

17 Claims, 9 Drawing Sheets

(51) Int. Cl.
  *H04L 5/00* (2006.01)
  *H04W 52/02* (2009.01)
  *H04W 24/10* (2009.01)
  *H04W 48/12* (2009.01)
  *H04W 52/32* (2009.01)
  *H04W 24/02* (2009.01)
  *H04W 52/34* (2009.01)
  *H04W 84/04* (2009.01)

(52) U.S. Cl.
  CPC ....... *H04L 5/0098* (2013.01); *H04W 52/0206* (2013.01); *H04L 5/0023* (2013.01); *H04L 5/0035* (2013.01); *H04L 5/0048* (2013.01); *H04W 24/02* (2013.01); *H04W 24/10* (2013.01); *H04W 48/12* (2013.01); *H04W 52/244* (2013.01); *H04W 52/325* (2013.01); *H04W 52/34* (2013.01); *H04W 84/045* (2013.01); *Y02D 70/1242* (2018.01); *Y02D 70/1262* (2018.01); *Y02D 70/1264* (2018.01); *Y02D 70/142* (2018.01); *Y02D 70/166* (2018.01)

(58) Field of Classification Search
  USPC .................. 370/352, 252, 329, 311, 331
  See application file for complete search history.

(56) References Cited

U.S. PATENT DOCUMENTS

| | | |
|---|---|---|
| 2011/0199986 A1 | 8/2011 | Fong et al. |
| 2012/0039284 A1 | 2/2012 | Barbieri et al. |
| 2012/0113905 A1 | 5/2012 | Anderson et al. |
| 2012/0213096 A1* | 8/2012 | Krishnamurthy ....... H04L 5/001 370/252 |
| 2012/0329468 A1 | 12/2012 | Chmiel et al. |
| 2013/0010619 A1 | 1/2013 | Fong et al. |
| 2013/0033998 A1* | 2/2013 | Seo ....................... H04W 24/00 370/252 |
| 2013/0039203 A1* | 2/2013 | Fong ...................... H04B 7/024 370/252 |
| 2013/0040640 A1* | 2/2013 | Chen ................. H04W 36/0083 455/434 |
| 2013/0040675 A1* | 2/2013 | Ant ...................... H04W 52/226 455/509 |
| 2014/0092823 A1* | 4/2014 | Song ......................... H04L 1/00 370/329 |
| 2015/0055502 A1 | 2/2015 | Seo et al. |
| 2015/0349902 A1* | 12/2015 | Moulsley .............. H04L 5/0091 370/252 |
| 2015/0358094 A1* | 12/2015 | Yi ......................... H04B 17/318 370/252 |
| 2015/0358923 A1* | 12/2015 | Teng ..................... H04W 52/28 455/522 |
| 2016/0066264 A1* | 3/2016 | Miao ................. H04W 52/0206 370/311 |

OTHER PUBLICATIONS

International Search Report received in Application No. PCT/US2014/037578, dated Oct. 14, 2014, 13 pages.

3GPP TSG RAN WG1 Meeting #72bis, NTT DOCOMO, "Views on Enhanced Small Cell Discovery", Agenda Item 7.2.5.3.2, Chicago, Apr. 15-19, 2013, R1-131425, 9 pages.

3GPP TSG-RAN WG1 #72bis, MediaTek Inc., "On/Off Operation and Discovery of Small Cells", Agenda Item 7.2.5.3.2, Chicago, Apr. 15-19, 2013, R1-131186, 4 pages.

3GPP TSG-RAN1#66 meeting, Samsung, "UL PC for Networks with Geographically Distributed RRHs", Agenda Item 6.7.3, Athens, Greece, Aug. 22-26, 2011, R1-112523, p. 1-5.

Catt, "Draft LS Response on interruptions at activation/deactivation", 3GPP TSG RAN WG4 Meeting #62bis, Jeju, Korea, R4-121431, Mar. 26-30, 2012, 2 pages.

Alcatel-Lucent, et al., "Usage of Cell Index for CC Management", TSG-RAN WG2#70bis, R2-103855, Jun. 28-Jul. 2, 2010, Stockholm, Sweden, XP050451261, 3 pages.

\* cited by examiner

SYSTEMS AND METHODS FOR NETWORK ADAPTATION SUPPORT IN WIRELESS NETWORK

This application claims the benefit of U.S. Provisional Application No. 61/822,181 filed on May 10, 2013 by Jialing Liu et al. and entitled "Systems and Methods for Network Adaptation Support in Wireless Network," which is hereby incorporated herein by reference as if reproduced in its entirety.

TECHNICAL FIELD

The present invention relates to the field of wireless network communications, and, in particular embodiments, to systems and methods for network adaptation support in wireless network.

BACKGROUND

Wireless communication systems include long term evolution (LTE), LTE Advanced (LTE-A), and LTE-A beyond systems. Modern wireless communications system include NodeBs (NBs) (also referred to as base stations), communications controllers, or eNBs (enhanced NBs) and may also include network points using different radio access technologies (RATs) such as high speed packet access (HSPA) NBs and WiFi access points (APs). A NB may be serving a number of users (also referred to as User Equipment (UE), mobile stations, subscribers, or terminals) in a coverage area over a period of time. Some networks, such as heterogeneous network (HetNets), include a macro cell (e.g., a NB) which is a higher power node/antenna with a larger coverage, and a pico cell which is a lower power node/antenna with a smaller coverage. Lower power nodes (also referred to as pico cells, Femto cells, micro cells, relay nodes, remote radio heads, remote radio units, or distributed antennas) are low-power wireless access points that operate in a licensed spectrum. Lower power nodes (LPNs) provide improved cellular coverage, capacity and applications for homes and businesses, as well as metropolitan and rural public spaces. LPNs can be turned off to reduce interference and save power or turned on to increase capacity, according to network and user demands. Various flexibility and adaptability features to allow better usage of resources in such networks.

SUMMARY OF THE INVENTION

In accordance with an embodiment, method supporting network adaptation by a network component includes receiving, by the network component, a discovery reference signal (DRS) from a network controller, wherein the network controller is in a switch-off transmission mode. The network component then performs measurements according to the DRS, and reports the measurements to a network associated with the network controller. In return, the network component receives a radio resource control (RRC) signaling from the network. The RRC signaling includes configuration information allowing a connection between the network component and the network controller. The network component then connects with the network controller in accordance with the configuration information.

In accordance with another embodiment, a network component supporting network adaptation comprises at least one processor and a non-transitory computer readable storage medium storing programming for execution by the at least one processor. The programming including instructions to receive a DRS from a cell in a switch-off transmission mode. The instructions further configure the network component to perform measurements according to the DRS, and report the measurements to a network associated with the cell. The network component is further configured to receive a RRC signaling from the network. The RRC signaling includes configuration information allowing a connection between the network component and the cell. The network component and the network controller then establish the connection in accordance with the configuration information.

In accordance with another embodiment, a method supporting network adaptation by a network controller includes receiving, by the network controller, a report of DRS based measurements from a UE. The DRS based measurements are performed by the UE upon receiving a DRS from a second network controller in a switch-off transmission mode. The method further includes sending, by the network controller to the second network controller, one of a request to turn on transmission at the second network controller and a request to serve the UE by the second network controller. The second network controller further sends to the UE a RRC signaling including configuration information allowing a connection between the UE and the second network controller.

In accordance with yet another embodiment, a network controller supporting network adaptation comprises at least one processor and a non-transitory computer readable storage medium storing programming for execution by the at least one processor. The programming includes instructions to receive a report of DRS based measurements from a UE. The DRS based measurements are performed by the UE upon receiving a DRS from a second network controller in a switch-off transmission mode. The instructions further configure the network controller to send to the second network controller one of a request to turn on transmission at the second network controller and a request to serve the UE by the second network controller. The network controller is also configured to send a RRC signaling to the UE. The RRC signaling includes configuration information allowing a connection between the UE and the second network controller.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 14 is a diagram that illustrates a typical scenario for a UE to connect to a cell that turns on;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
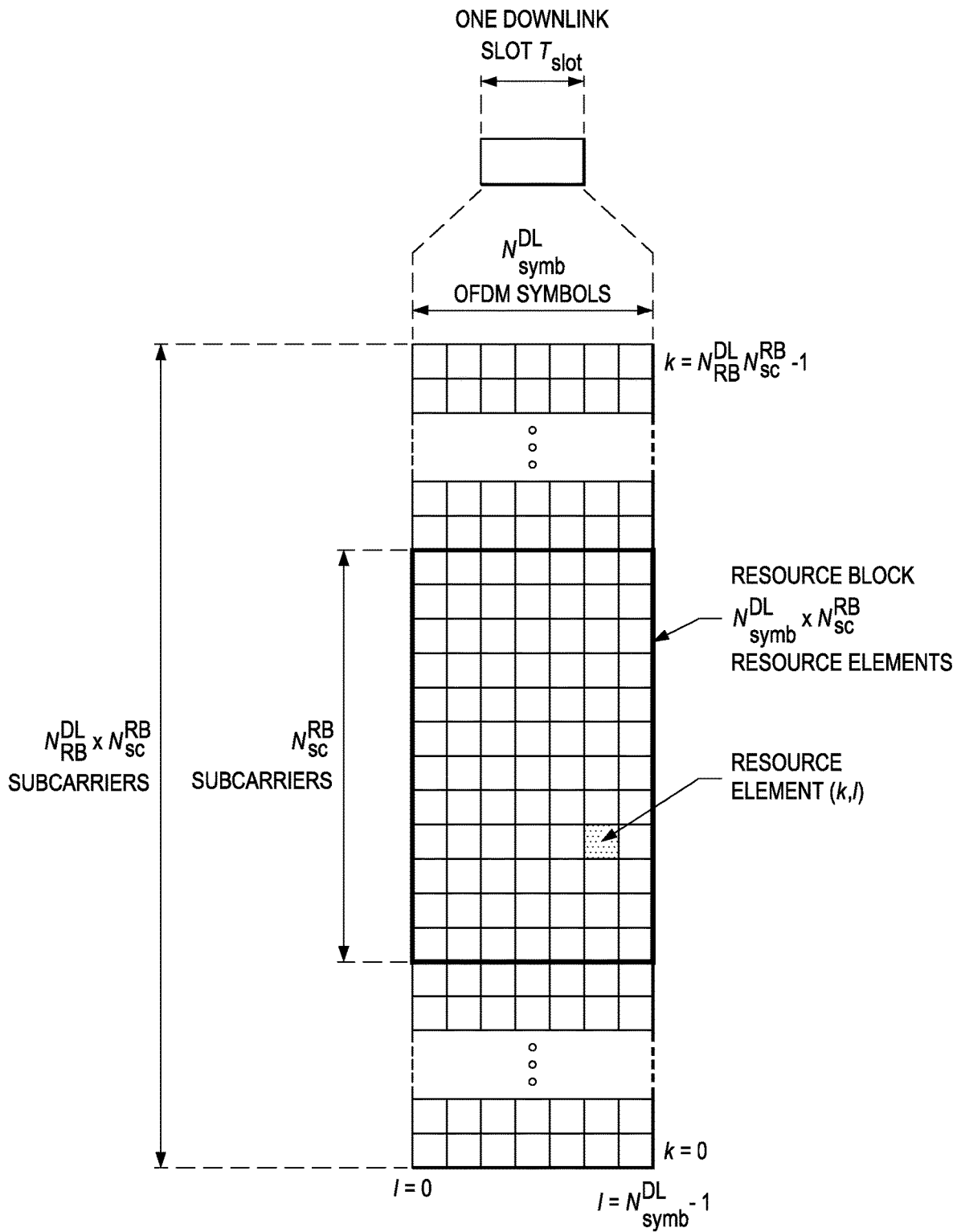
FIG. 1 is a diagram that illustrates example orthogonal frequency-division multiplexing (OFDM) symbols with normal cyclic prefix (CP)

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In a modern wireless communications system, such as a Third Generation Partnership Project (3GPP) LTE compliant communications system, a plurality of eNBs, also commonly referred to as cells, may be arranged into a cluster of cells (coverage areas), with each cell having multiple transmit antennas. Additionally, each cell or eNB may be serving a number of users or UEs based on a priority metric, such as fairness, proportional fairness, round robin, and the like, over a period of time. As used herein, the terms cell, transmission point, and eNB may be used interchangeably. Distinction between cells, transmission points, and eNBs is made where needed. The transmission/reception from a controller (e.g., eNB) to a UE is called downlink (DL) transmission/reception, and the transmission/reception from a UE to a controller is called uplink (UL) transmission/reception.

In orthogonal frequency-division multiplexing (OFDM) systems, the frequency bandwidth is divided into multiple subcarriers in frequency domain. In time domain, one subframe is divided into multiple OFDM symbols. The OFDM symbol may have a cyclic prefix (CP) to avoid inter-symbol interference due to multiple path delays. One resource element (RE) is defined by the time-frequency resource within one subcarrier and one OFDM symbol. In a downlink transmission, reference signals (RSs) and other signals, such as a data channel (physical downlink shared channel (PDSCH)), a control channel (physical downlink control channel (PDCCH)), and an enhanced PDCCH (EPDCCH), are orthogonal and multiplexed in different resource elements in the time-frequency domain. In an uplink transmission, a physical uplink shared channel (PUSCH) and a physical uplink control channel (PUCCH) are orthogonal and multiplexed in different time-frequency resources. A set of REs are grouped together to form a resource block (RB). For example, 12 subcarriers in a slot make up a RB. Further, the signals are modulated and mapped into resource elements. Using inverse fast Fourier transform (IFFT) per each OFDM symbol, the signals in frequency domain are transformed into the signals in time domain, and are transmitted with added CP to avoid the inter-symbol interference.

To enable any data channels in either UL or downlink DL transmissions, such as PDSCH or PUSCH in an LTE-A system, reference signals are transmitted. There are reference signals for a UE to perform channel/signal estimation/measurements for demodulation of PDCCH and other common channels, and for measurements and feedback. Such reference signals include the Common/Cell-specific Reference Signal (CRS) inherited from the Rel-8/9 specification of evolved Universal Mobile Telecommunications System (UMTS) Terrestrial Radio Access (E-UTRA). A Dedicated/De-modulation reference signal (DMRS) can also be transmitted with the PDSCH channel in Rel-10 of E-UTRA. The DMRS is used for channel estimation during PDSCH demodulation.

FIG. 1 illustrates example OFDM symbols with CP. There are 14 OFDM symbols labeled from 0 to 13 in each subframe. The symbols 0 to 6 in each subframe correspond to even slots, and the symbols 7 to 13 in each subframe correspond to odd slots. In the figure, only one slot of a subframe is shown. There are 12 subcarriers labeled from 0 to 11 in each RB, and hence in this example, there are 84 REs in this slot of the RB. In each subframe, there are a number of RBs, and the number may depend on the bandwidth (BW).

Figure 2:
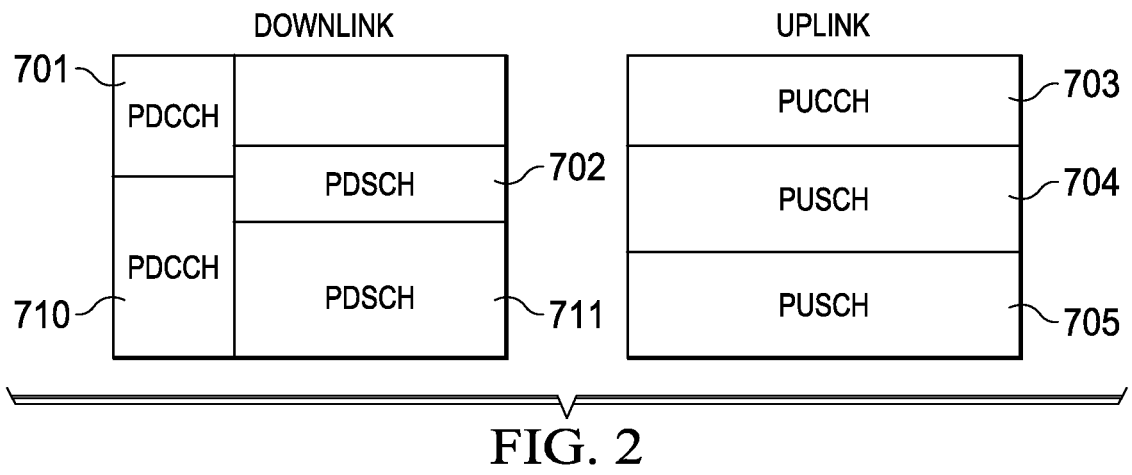
FIG. 2 is a diagram that illustrates example physical data and control channels.

FIG. 2 shows a PDSCH carrying data packets on the DL from an eNB to UEs at a physical layer, and a physical uplink shared channel (PUSCH) carrying data packets from the UEs to the eNB on the UL in the physical layer. Also shown are the corresponding physical downlink control channels (PDCCHs) transmitted from the NB to the UEs. The PDCCH indicates where the corresponding PDSCH and/or PUSCH is in frequency domain and in which manner the PDSCH and/or PUSCH is transmitted. For instance, the PDCCH 701 may indicate the signaling for PDSCH 702 or PUSCH 704. In Release 11, an EPDCCH is a downlink control channel that has a similar functionality as PDCCH. However, the transmission of the EPDCCH may be in the data region of an LTE Rel-8 system, and EPDCCH demodulation is based on the DMRS as opposed to CRS-based demodulation for PDCCH.

Figure 3:
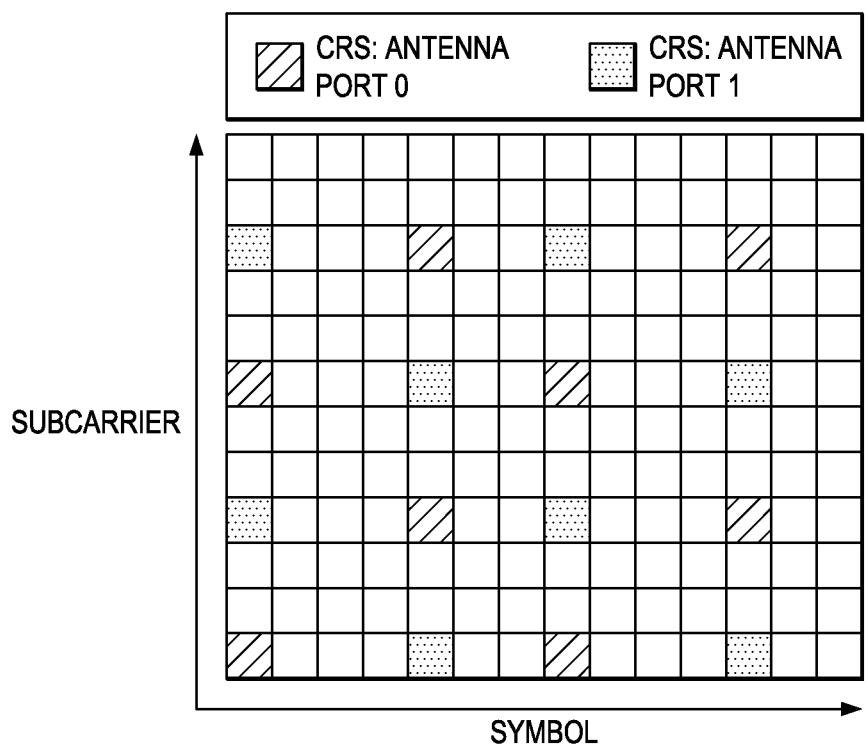
FIG. 3 is a diagram that illustrates an example reference signal (CRS)

In downlink transmission of LTE-A systems, the CRS is a reference signal, inherited from the Rel-8/9 specification of E-UTRA, for the UE to perform channel estimation for demodulation of PDCCH and other common channels and for measurement and some feedback. FIG. 3 shows an example of the CRS. The CRS may be used by the UE to derive Radio Resource Management (RRM) measurements, such as reference signal received power (RSRP) measured on CRS REs and reference signal received quality (RSRQ). The RSRQ is the ratio between RSRP and the received signal strength indicator (RSSI) measured on all the REs.

Figure 4:
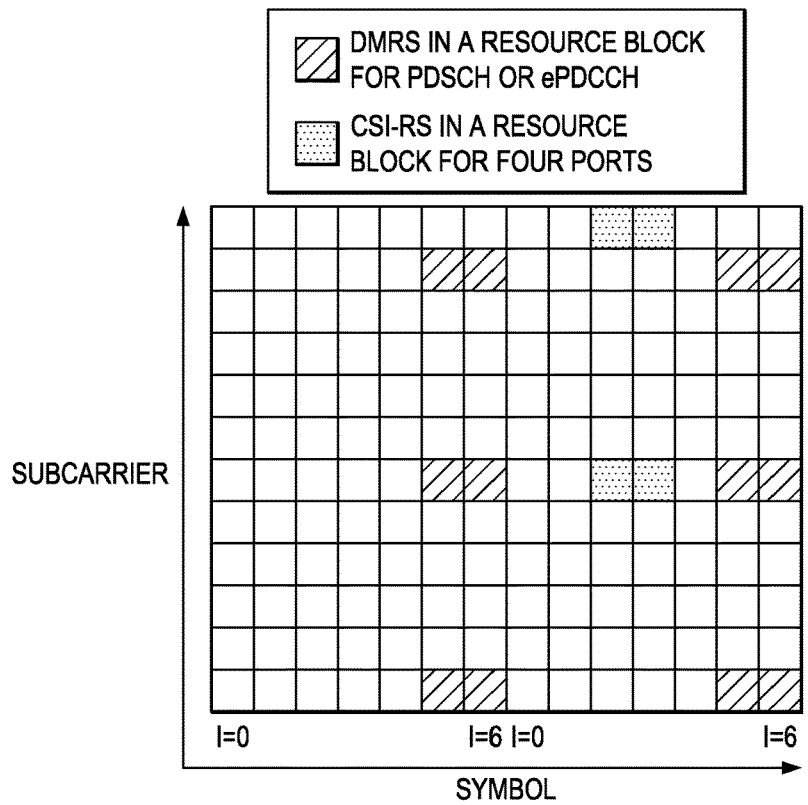
FIG. 4 is a diagram that illustrates example channel status indicator reference signal (CSI-RS) and dedicated/de-modulation reference signal (DMRS)

The DMRS can be transmitted together with the PDSCH channel in Rel-10 of E-UTRA. The DMRS is used for channel estimation during PDSCH demodulation. The DMRS can also be transmitted together with EPDCCH for the channel estimation of EPDCCH by the UE. FIG. 4 shows a CSI-RS which is introduced in Rel-10, in addition to CRS and DMRS. The CSI-RS is used for Rel-10 UEs to measure the channel status, such as for multiple antennas cases. The Precoding Matrix Indicator (PMI)/Channel Quality Indicator (CQI)/Rank Indicator (RI) of the precoding matrix and other feedback information may be based on the measurement of CSI-RS for Rel-10 and beyond UE. There may be multiple CSI-RS resources configured for a UE. The eNB assigns a specific time-frequency resource and scrambling code for each CSI-RS resource. CSI-RS in Rel-10 can support up to 8 transmission antennas, while CRS can only support up to 4 transmission antennas in Rel-8/9. The number of CSI-RS antenna ports can be 1, 2, 4, and 8. To support the same number of antenna ports, CSI-RS has substantially lower overhead due to its relatively low density in time and frequency.

A RS (e.g., CRS, CSI-RS or DMRS) may be used at a receiver to estimate the channel impulse response and/or channel power delay profile (PDP). The RS is typically a pseudorandom sequence modulated using Quadrature Phase Shift Keying (QPSK) on the subcarriers assigned for RS transmission. Upon receiving the RS, the receiver performs demodulation and descrambling by multiplying the conjugate of the pseudorandom sequence. The resulting signal is then transformed into time domain by IFFT operation to obtain the channel PDP estimation. Further measurements may be performed based on the obtained PDP estimates. The RSs from different transmitters may be assigned to different sets of subcarriers and hence are separated in frequency domain. The RSs from different transmitters may also be assigned to different pseudorandom sequences and hence are separated via low correlation between the pseudorandom sequences. Alternatively, the RSs may be assigned to transmit on the same set of subcarriers and using the same pseudorandom sequence. As such, the RSs can strongly interfere with each other. In current LTE systems, the use of the same pseudorandom sequence in RSs for different cells on the same set of time/frequency resources may be done if the cells are far apart from each other so that the RS interference may be reduced to an acceptable range. This decision can be made at the network planning stage.

In heterogeneous networks (HetNets), there are high power macro points and various lower power points that generally may share the same communication resources. The lower power points may include, but are not limited to, picos, remote radio heads (RRHs), femto cells (or home eNBs (HeNBs)), access points (APs), distributed antennas (DAS), relays, and near field communication points. Macro eNBs are used to provide wide area coverage, typically within a few hundred meters to a few kilometers of radius. The low-power points are generally used to provide high throughputs to UEs close to the nodes, e.g., within several meters to tens of meters.

In the 3GPP Rel-10 specification, a component carrier is called a cell. When multiple cells are controlled by a same eNB, cross scheduling of multiple cells is possible using a single scheduler in the same eNB to schedule the multiple cells. With carrier aggregation (CA), one eNB may operate and control several component carriers forming a Pcell and a Scell. In Rel-11 design, an eNB may control both a macro cell and a pico cell. In this case, the backhaul between the macro cell and the pico cell is fast backhaul. The eNB can control the transmission/reception of both macro cell and pico cell dynamically. The PDCCH or EPDCCH transmitted from the macro cells can be used to indicate the PDSCH or PUSCH transmitted from the pico cells.

Component carriers in a network can operate in different frequency bands. High frequency bands generally have a high path loss over distance and thus are more suitable to serve a relatively smaller area, such as used for high throughput purpose for nearby UEs. Low frequency bands generally have low path loss over distance and thus are more suitable to serve a relatively large area, such as used for providing coverage.

The eNBs in a network may be arranged close to each other so that a decision made by a first eNB may have an impact on a second eNB. For example, the eNBs may use their transmit antenna arrays to form beams towards their UEs when serving them. For instance, if a first eNB decides to serve a first UE in a particular time-frequency resource, it may form a beam pointing to that UE. However, the pointed beam may extend into a coverage area of the second eNB and cause interference to UEs served by a second eNB. The inter-cell interference (ICI) for small cell wireless communications systems is commonly referred to as an interference limited cell scenario, which may be different from a noise limited cell scenario in large cell wireless communications systems.

In Rel-12 or beyond design, the backhaul between the macro cell and the pico cell may not be fast backhaul. In other words, the backhaul may be slow backhaul, or any backhaul. In slow backhaul scenario, the PDCCH or EPDCCH transmitted from the macro cells cannot be used to indicate the PDSCH or PUSCH transmitted from the pico cells.

In actual network implementations, there may be multiple macro points and multiple pico points operating in multiple component carriers, and the backhaul between any two points can be fast backhaul or slow backhaul depending on the deployment. When two points have fast backhaul, the fast backhaul may be fully utilized, e.g., to simplify the communication method and system or to improve coordination. The points configured for a UE for transmission or reception may include multiple points, where some pairs of points may have fast backhaul and other pairs of points may have slow backhaul or any backhaul.

In some deployments, an eNB may control one or more cells. Multiple remote radio units may be connected to the same base band unit of the eNB by fiber cable, and the latency between base band unit and remote radio unit is substantially small. As such, the same base band unit can process the coordinated transmission/reception of multiple cells. For example, the eNB may coordinate the transmissions of multiple cells to a UE, which is referred to as coordinated multiple point (CoMP) transmission. The eNB may also coordinate the reception of multiple cells from a UE, which is referred to as CoMP reception. In this case, the backhaul link between the cells with the same eNB is fast backhaul and the scheduling of PDSCH transmitted in different cells for the UE can be easily coordinated in the same eNB.

Downlink coordinated multi-point (DL-CoMP) has been addressed in 3GPP, and three main areas of focus have been identified. The work for specifying CoMP support in Rel-11 focuses on joint transmission (JT), dynamic point selection (DPS), including dynamic point blanking (DPB), and coordinated scheduling/beamforming (CS/CB), including dynamic point blanking Generally, there are four CoMP scenarios. The scenarios include a homogeneous network with intra-site CoMP, a homogeneous network with high transmission power RRHs, an heterogeneous network with low power RRHs within the macro cell coverage where the transmission/reception points created by the RRHs have different cell IDs as the macro cell, and an heterogeneous network with low power RRHs within the macro cell coverage where the transmission/reception points created by the RRHs have the same cell IDs as the macro cell. In the last scenario (heterogeneous cell where the RRHs have the same cell IDs), a single shared cell-ID is used for multiple sites. In this case, cell ID-based transmission set configuration generally is not applicable. The CSI-RS-based configuration is used for this scenario instead of cell-ID based configuration.

As an extension of the HetNet deployment, possibly densely deployed small cells using low power nodes are promising to cope with mobile traffic explosion, such as for hotspot deployments in indoor and outdoor scenarios. As described above, a low-power node is a node whose transmission power is lower than macro node and BS classes. For example pico and femto eNBs are both applicable. Small cell enhancements for E-UTRA and E-UTRAN focus on additional functionalities for enhanced performance in hotspot areas for indoor and outdoor using possibly densely deployed low power nodes.

Figure 5:
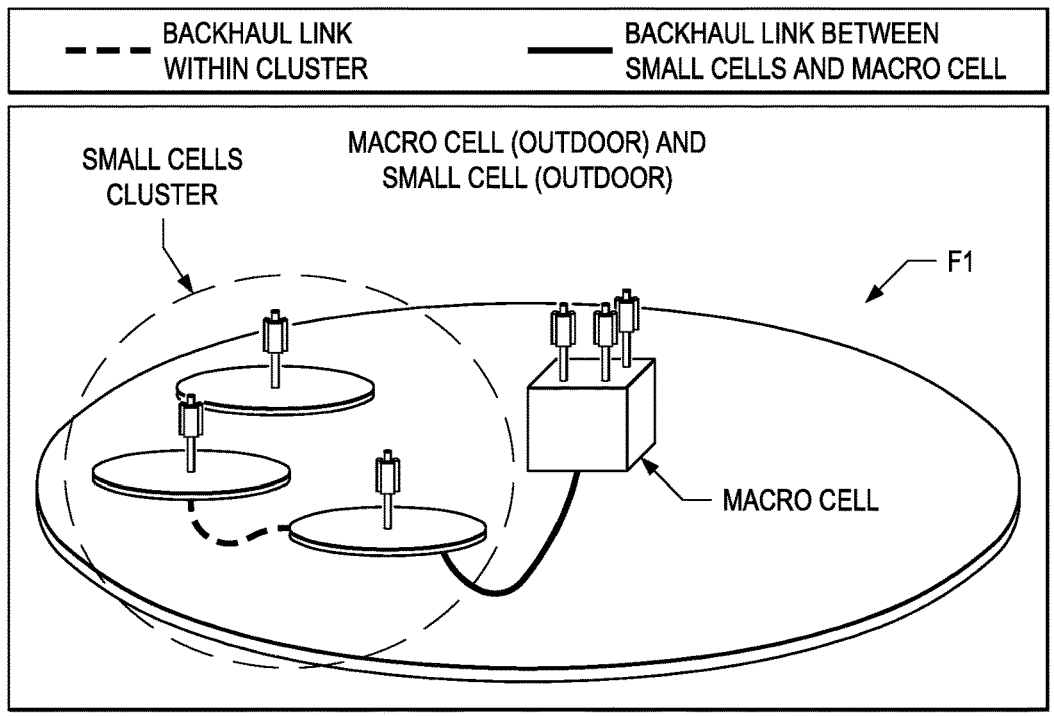
FIG. 5 is a diagram that illustrates a scenario of co-channel macro and small cells.
Figure 6:
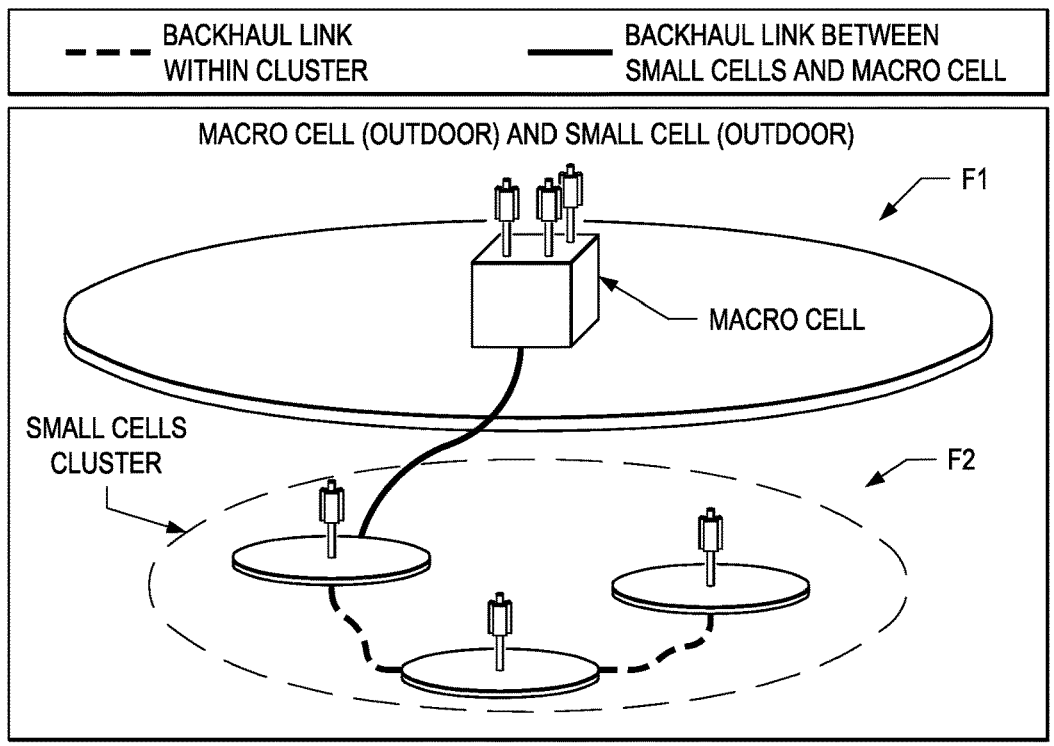
FIG. 6 is a diagram that illustrates a scenario of separate channel macro and outdoor small cells.
Figure 7:
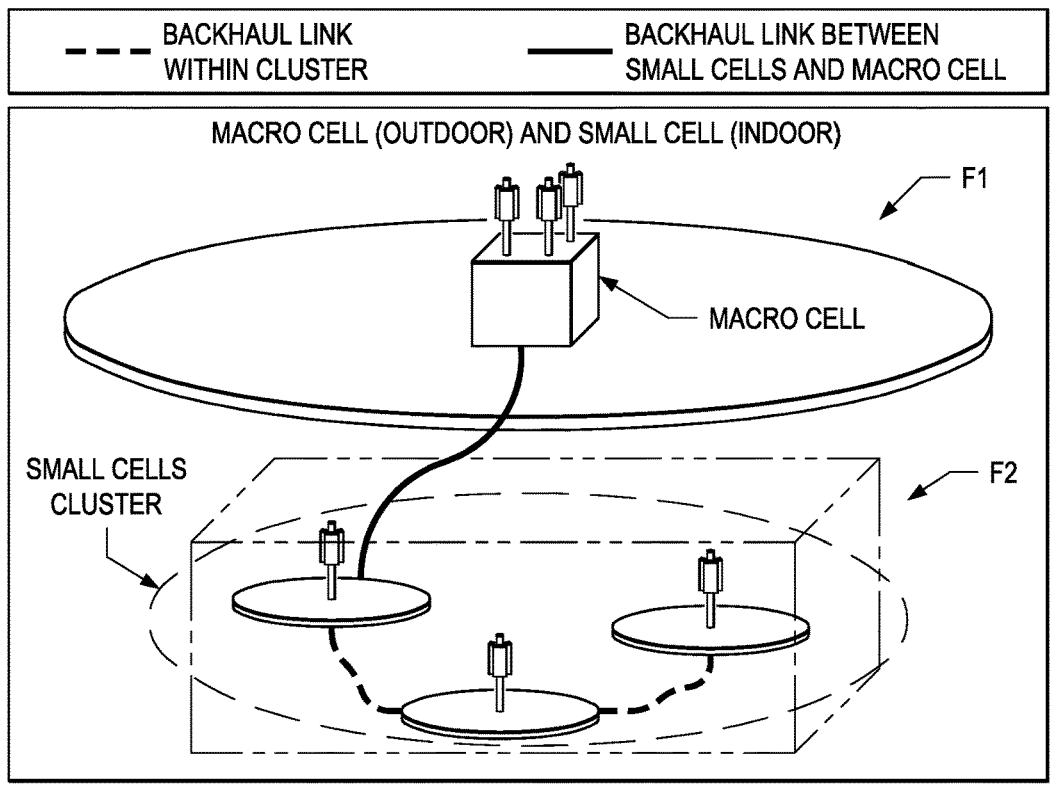
FIG. 7 is a diagram that illustrates another scenario of separate channel macro and outdoor small cells.
Figure 8:
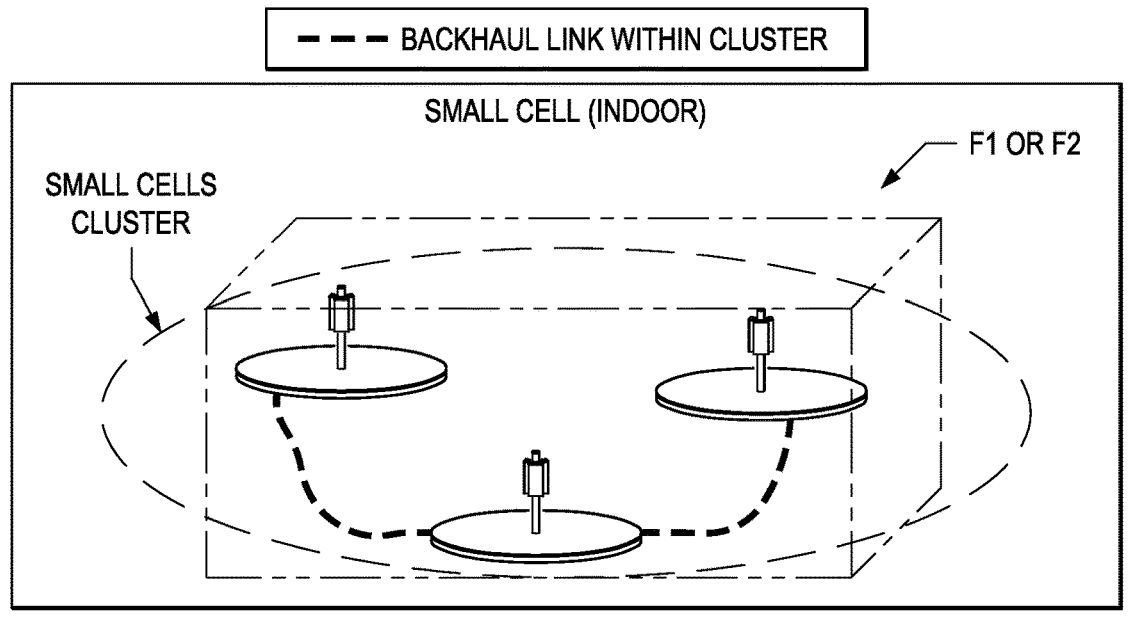
FIG. 8 is a diagram that illustrates a scenario of small cells without macro coverage.

FIGS. 5 to 8 illustrate various small cell deployment scenarios. FIG. 5 shows co-channel macro and small cells. FIG. 6 shows separate channel macro and outdoor small cells. FIG. 7 shows separate channel macro and indoor small cells. FIG. 8 shows small cells without macro coverage.

A UE can discover the surrounding small cells by first identifying the cell through detecting a downlink Primary Synchronization Signal (PSS)/Secondary Synchronization Signal (SSS). The UE then performs signal power measurement based on the downlink CRS of these identified cells. If the measured signal power is above a predefined threshold, the cell discovery is considered successful. For mobility and other network operation optimization purposes, the UE may be required to monitor several cells. To increase the chance that the UE is able to discover weaker cells under one or two dominant strong interfering cells, an interference cancellation (IC) technique may be used in which the dominant strong interfering cells are first discovered and then their PSS/SSS/CRS are reconstructed and subtracted from the UE received signal. Weaker cell discovery is then performed upon the remaining signal.

In dense small cell scenarios, there could be several strong interferers of similar strength. Under this interference condition, there is little benefit of interference cancellation due to the lack of a small number of dominant interferers. In another small cell deployment scenario, efficient small cell operation may require the introduction of techniques for interference management where some small cells may be silent at certain times. With the reduced interference, it may be possible to maintain or even improve the network throughput performance with reduced network resources, in cases such as where the traffic load is light or medium. If the traffic load increases, then the network may activate some inactive small cells to support the increased traffic load. For example, transmission of common signals can be avoided in certain subframes without negative impact to the UE measurements. If such solutions consist of cells that stop transmitting for a long time, then the discovery of these cells would become even more challenging.

When performing limited monitoring activities, e.g., without CRS or CSI-RS transmission, a network node/carrier/antenna set, may need to transition to data transmission/receiving (Tx/Rx) state (in which CRS and/or CSI-RS is transmitted) when a number of UEs enter its coverage area. With the assistance of the network, the UEs that meet predefined criteria (e.g., path loss, load, mobility) may transmit special physical signals, referred to as Transition Request Signals (TRSs), using a specific hopping pattern on designated resources. Based on the received signal strength distributions/levels, the network node/carrier/antenna set determines if it should transition to data Tx/Rx state or stay in limited monitoring state. This adapts the network to the dynamic traffic situation.

Service demand in a network may vary significantly. In worse cases, such as during network rush hours or peak hours, the service demand can be much higher than normal. To cope with such situations, operators usually deploy their network infrastructure in a way such that peak service demand requirements can be met. This is generally attained by using relatively smaller macro cells (with reduced cell sizes) combined with a considerable number of low power nodes (LPNs) which are densely distributed and may even be redundant under a normal service condition, and with multiple component carriers and frequency bands supported which may also be redundant under a normal service condition. Such network infrastructure deployment is targeted for peak service demands and can become over-provisioned for normal or off-peak service demands, which may be significantly lower than the peak demands. In this case, the over-provisioning network is generally not optimal, or even not suitable for normal service demands.

Over-provisioning the network presents a challenge for interference management/coordination. Interference management approaches have been proposed to deal with specific interference conditions, such as almost blank subframes (ABS) intended to reduce macro interference when a macro strongly interferes with pico UEs in macro-pico deployments. However, such approaches are not intended for a dense and over-provisioning network. For instance, one issue that needs to be addressed is that the dominant interference may not be from one cell (e.g., the macro) but from several cells (e.g., several pico cells or small cells), and hence blanking one cell does not improve the performance much. Another issue is regarding power consumption in an over-provisioned network. Keeping most of the network nodes active most of the time may waste considerable energy, and may also increase network operation complexity, cost, and chances of failures.

Therefore, it is desired to introduce higher degrees of flexibility and adaptability into the network, so that the network can better adapt its resources to varying service demands. For example, an eNB may transition to a state of transmitting DL CRS, CSI-RS, or PDSCH considering the UEs within the coverage area of the point/cell or carrier/frequency of the eNB, for instance if the number of UEs in the coverage area is considered large. An eNB may also stop transmission or decide not to transmit DL CRS, CSI-RS, or PDSCH on a set of antennas considering the UEs within the coverage area, for instance if the number of UEs in the coverage area is considered small.

Figure 9:
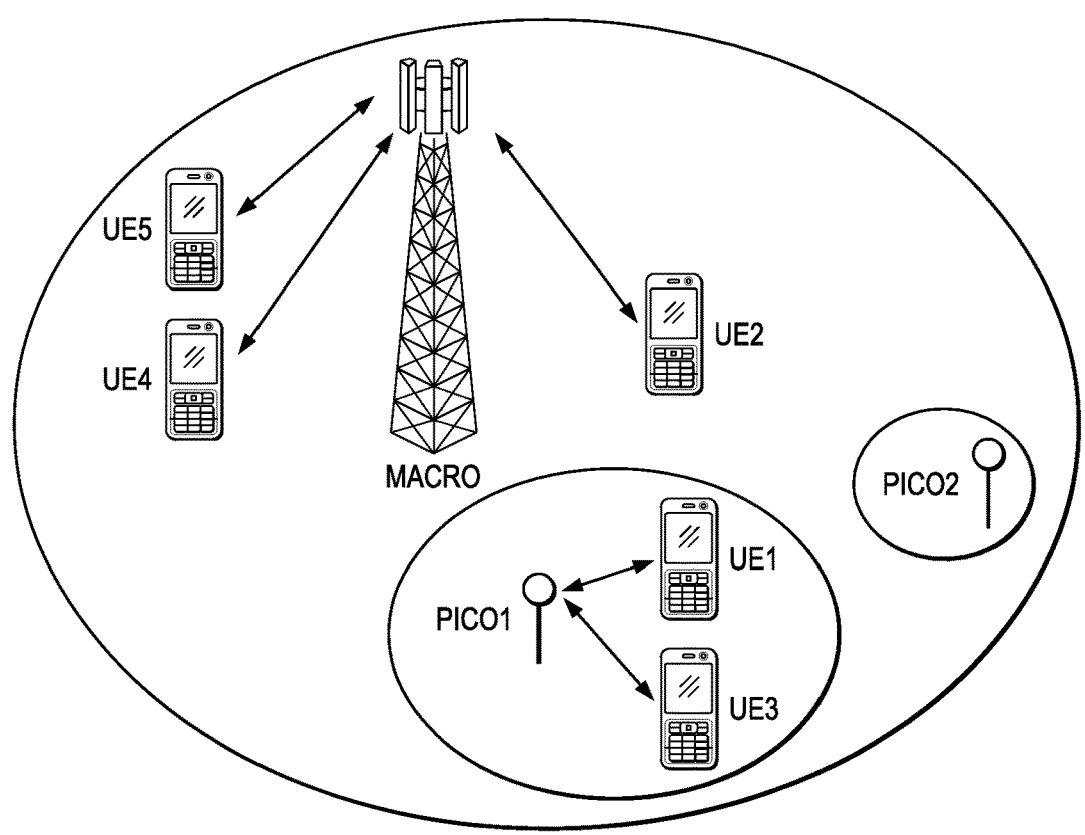
FIG. 9 is a diagram that illustrates a scenario of a first pico cell serving UEs, and a second pico cell not serving any UEs.

FIG. 9 shows a macro point and two pico points, Pico1 and Pico2. There are no UEs in the coverage area of Pico2 to serve. If this situation lasts a considerable period of time, it may be beneficial to reduce Pico2 Tx/Rx activities to reduce interference and power consumption, among other benefits. Thus, Pico2 may turn off CRS and/or CSI-RS transmission and only monitor a limited set of resources. In contrast to Pico2, Pico1 is in active operation mode and performs data Tx and/or Rx with two UEs, UE1 and UE3. Pico1 also performs CRS and/or CSI-RS transmission. The macro point serves the UEs, UE2, UE4, and UE5.

Figure 10:
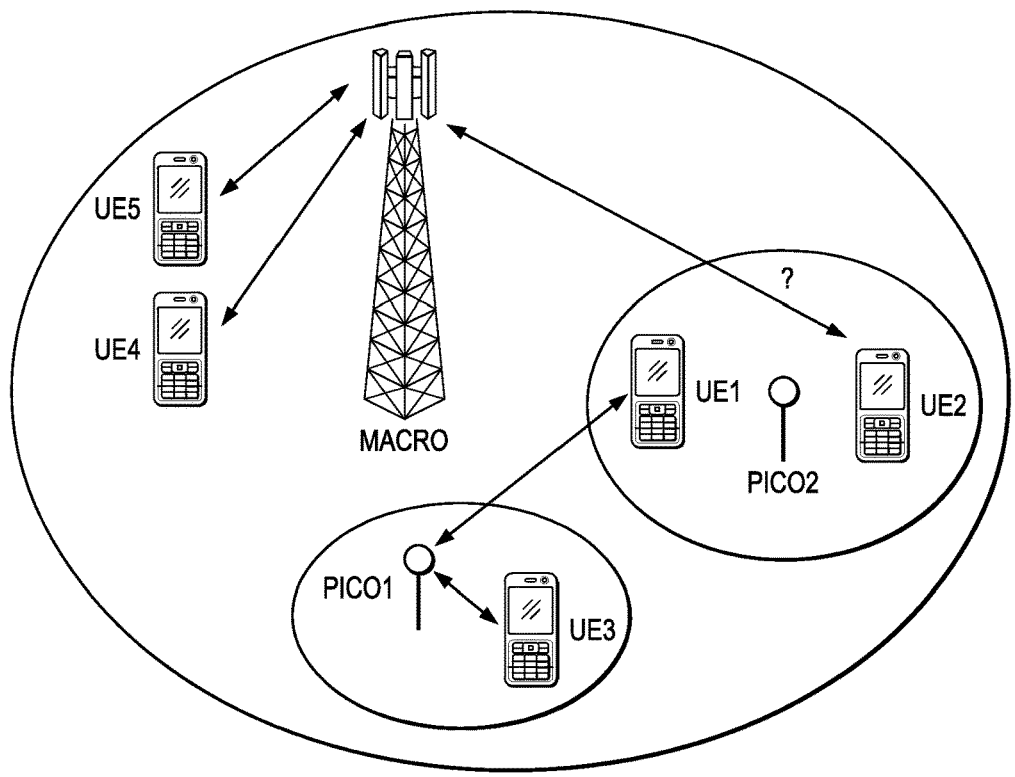
FIG. 10 is a diagram that illustrates a scenario of UEs entering an area served by the second pico cell of FIG. 1.

FIG. 10 shows a subsequent time shot of the system in FIG. 9. In FIG. 10 more UEs, UE1 and UE2, move into the coverage area of Pico2. Serving UE1 and UE 2 by other network points such as the macro or Pico1 may be difficult due to the relative distance of UE1 and UE2. Hence, Pico2 should know, with the assistance of the network, when and how to make a decision to increase its Tx/Rx activities. Similar cases exist for other types of network points (eNBs, RRHs, relays, DAS), near field communication nodes, component carriers/frequencies, and antenna sets, and similar implementations may be applied to these cases as well.

Figure 11:
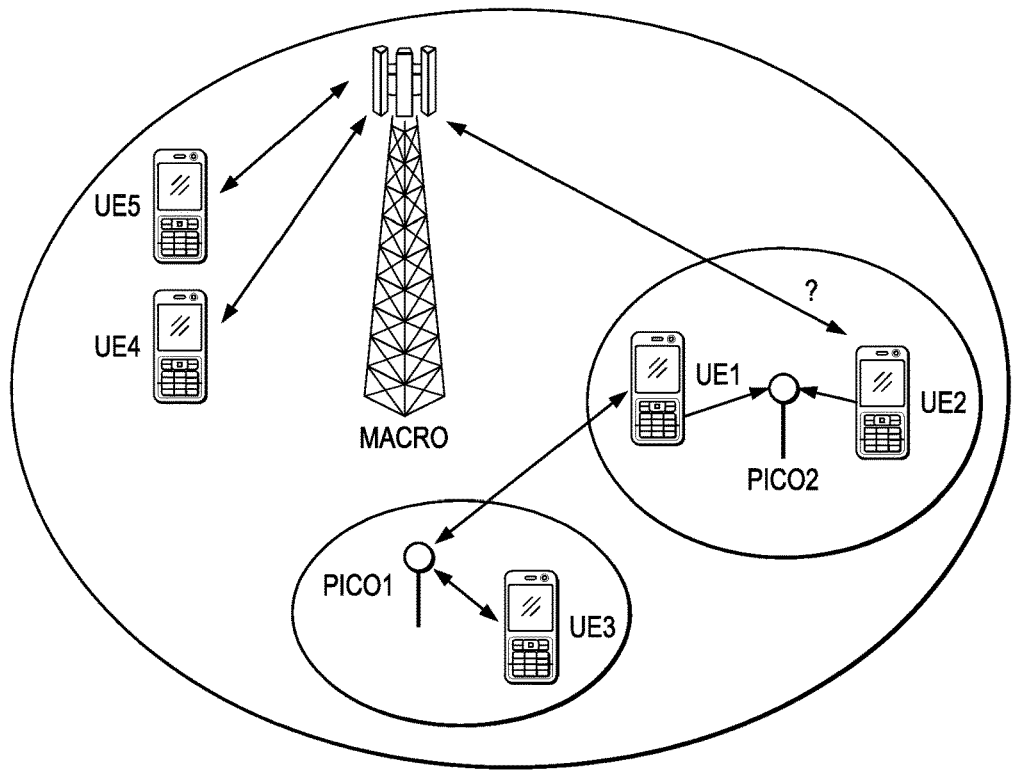
FIG. 11 is a diagram that illustrates an embodiment for adaptive transmission in the network.

FIG. 11 shows an embodiment of a network adaptation scheme to address the scenario in FIG. 10. Because UE1 and UE2 have relatively high path loss to the active serving points (macro and Pico1) and can overload the network, the network may decide to seek alternative serving points for these UEs. Thus, the network may select and instruct UE1 and/or UE2 to send TRSs on network designated resources with network configured power levels. When Pico2 receives the TRSs, Pico2 transitions into a more active mode such as by transmitting CRS/CSI-RS and consequently serving UE1 and/or UE2. Alternatively, Pico2 may stay in the reduced activity mode. The decision may be made by the macro which controls Pico2, based on the received TRS statistics on Pico2 and optionally based on neighboring points such as Pico1.

The scheme above may be adopted for more general transition/adaptation purposes, including turning a cell or point on/off or making modifications to transmissions or receptions, such as to antenna sets, channels (e.g., PDSCH, CRS, CSI-RS), component carrier sets, frequencies, or parameters for transmissions or receptions (e.g., Tx power). Embodiments are provided herein for suitable adaptation schemes, including small cell on/off adaptation, carrier selection, and downlink power control. The adaptation schemes may differ in various aspects, however similar mechanisms, procedures, and measurements may be implemented to support them, as described below. The adaptation schemes may be implemented together in a small cell deployment to ensure efficient operation of the networks.

Small cell on/off adaptation refers to the adaptive turning on and turning off of a small cell. When the small cell is turned on, the small cell acts as a legacy carrier and may transmit the signals existing in a legacy carrier and signals necessary for data transmission, such as reference signals used for measurements and demodulation. UEs may access the small cell and may receive data transmission from the cell. When the small cell is turned off, the small cell does not transmit any signals including legacy carrier signals or signals necessary for data transmission. UEs may not access the small cell and may not receive data transmission from the cell. However, even if a small cell is turned off, its power amplifier (PA) for DL transmission may or may not be turned off. Such decision may depend on network implementation and be transparent to the standards in 3GPP Radio Access Network Layer 1 (RAN1) and Access Network Layer 2 (RAN2). Small cell carrier selection refers to the adaptive turning on and turning off of one or more of a small cell's multiple component carriers (CCs). The transmission behavior of a turned-on (or turned-off) CC can be similar to that of a turned-on (or turned-off) small cell. Small cell downlink power control refers to the adaptation of a small cell (or a small cell CC) transmission power, including possibly both the common channel power and data channel power.

One purpose of small cell on/off adaptation is interference avoidance and coordination. A network may turn off selected small cells to reduce inter-cell interference, for instance the interference caused by common channel transmissions such as CRS. With the reduced interference, it may be possible to maintain or improve the network throughput performance with reduced network resources in cases such as where the traffic load is light or medium. If the traffic load increases, the network may turn on some turned-off small cells to support the heavier traffic load. Small cell on/off adaptation may also lead to energy savings. Small cell carrier selection or downlink power control may be implemented for similar purposes or other benefits.

Figure 12:
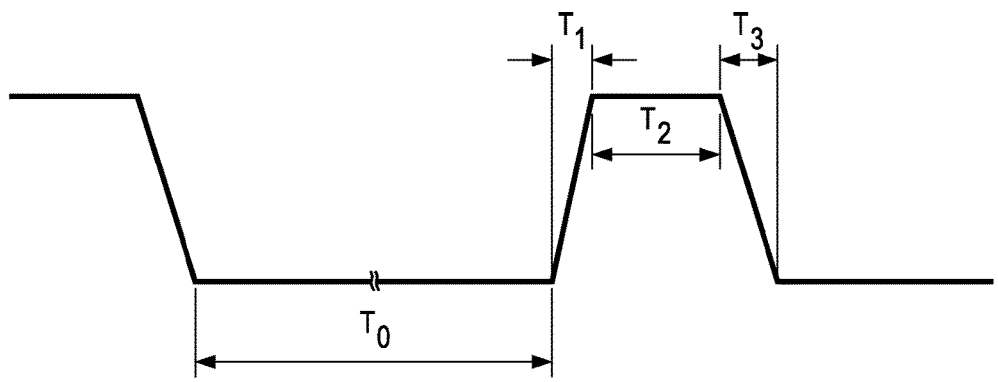
FIG. 12 is a diagram that illustrates an example of a timing diagram for small cell on/off adaptation.

FIG. 12 shows an example of a timing diagram for small cell on/off adaptation. The time period $T_0$ is the duration during which the small cell is turned off. The time period $T_1$ is the duration between the instance that a "turn on" decision is made and the instance that the small cell can transmit PDSCH. The length of $T_1$ may depend on the availability of sufficiently accurate UE measurements at the cell. The length of $T_1$ may further depend on, for example, on how long it may take for the cell configuration to be detected by UEs or signalled to UEs (e.g., signalled from a macro cell), how long it may take for a UE to receive downlink signals from the small cell or transmit valid uplink signals to the small cell (related to the activation/deactivation delays), how long the stable measurements may take, and/or UE reporting configurations. Thus, the time scale for $T_1$ may be of a few hundreds of milliseconds (ms) using currently existing procedures. The time period $T_2$ is the duration during which PDSCH can be transmitted, but whether/when/how the transmissions are performed may depend on implementations, e.g., the scheduler or transmission configurations. The time period $T_3$ is the duration between the instance that a "turn off" decision is made and the moment that the cell is turned off. The cell activity during this period may include handing over UEs (if any) to other cells, which may take several milliseconds to a few hundreds of milliseconds. It may be desired to have $T_1$ and $T_3$ sufficiently shorter than $T_2$ and $T_0$ since $T_1$ and $T_3$ represent "transient" or "overhead" periods. Small cell on/off adaptation cannot be faster than the time scales dictated by $T_1$ and $T_3$, the transient times needed for stable measurement requirements, or radio resource control (RRC) signaling time scales.

Figure 13:
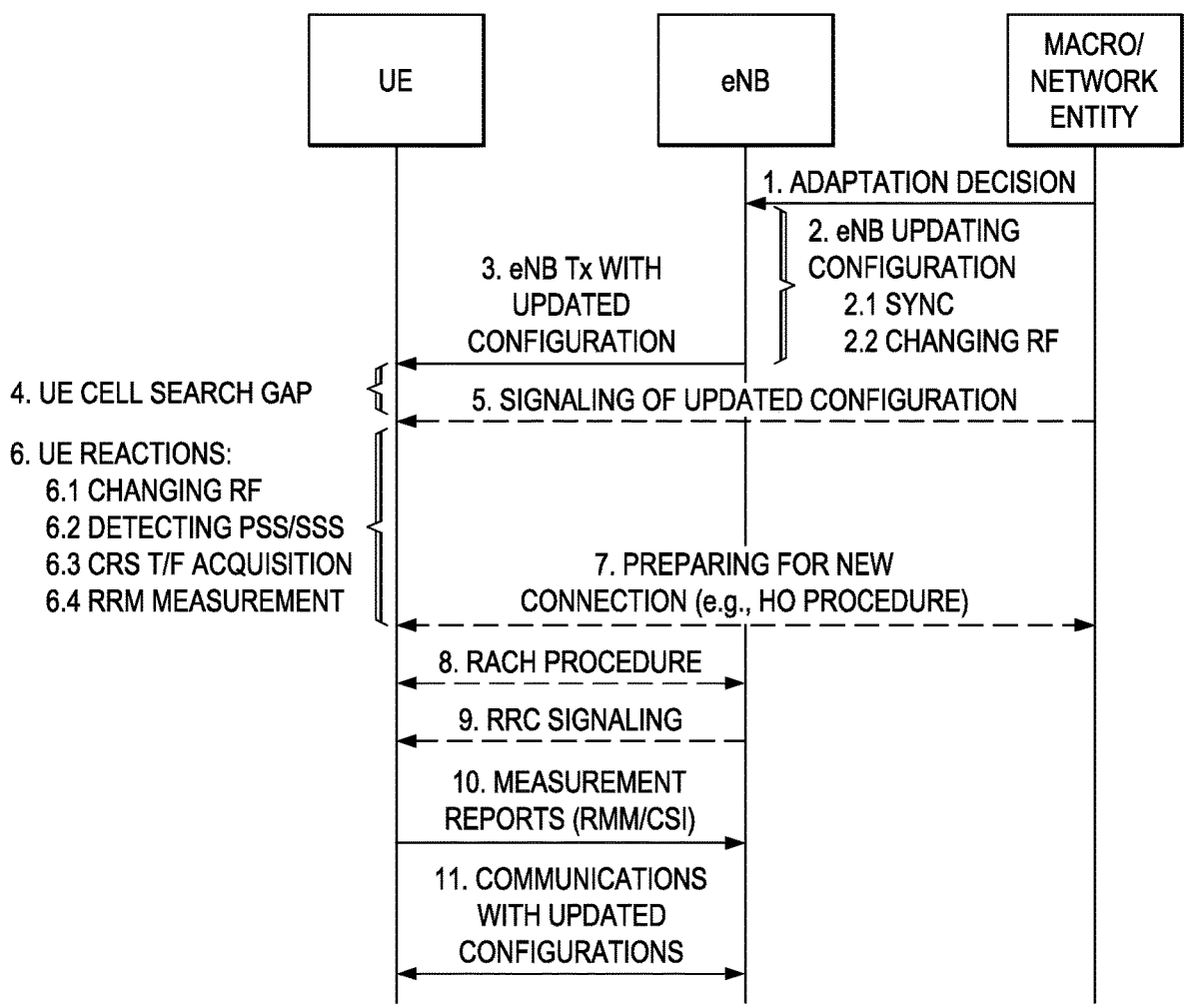
FIG. 13 is an event/signaling flow diagram that illustrates an embodiment method for network adaptation.

FIG. 13 shows an embodiment of an event/signaling method for network adaptation techniques such as small cells on/off, carrier selection, and power control. The events/signaling, including optional steps (shown in dashed lines), can be used for each of the three network adaptation techniques. Some of the events/signaling may occur concurrently with some other events/signaling. There may be elapsed times, for example due to backhaul delays, cell configuration detection, stable measurements, RRC signaling, or other reasons, that affect the feasible time scales for network adaptation.

The events/signaling include, at step 1, sending the adaptation decision from the macro/network entity to an eNB (e.g., of a small cell). At step 2, the eNB updates its configuration, such as synchronization and/or radio frequency (RF) configurations. At step 3, the eNB transmits its updated configuration to a UE. At step 4, the UE performs a cell search. At step 5, the UE receives from the macro/network entity a signaling of updated information. At step 6, the UE reacts by at least one of changing RF configuration, detecting PSS/SSS, acquiring a CRS, and performing RRM measurements. At a step 7, the UE performs a handover (HO) procedure with the macro/network entity to prepare for a new connection. At a step 8, the UE performs a Random Access Procedure (RACH) with the eNB. At step 9, the UE receives from the eNB a RRC signaling. At step 10, the UE sends a measurement report (e.g., RRM/CSI) to the eNB. At step 11, the UE and eNB begin communications according to the updated configurations.

Table 1 below shows feasible time scale examples for the various events/signaling above. The step numbers in the event/signaling column correspond to the numbering in FIG. 13. Regarding the small cell on/off adaptation, the feasible time scales may be different with or without network assistance. With network assistance, the network may inform the UE regarding the updated configuration (e.g., a small cell turning on), and then the UE can start detecting the updated configuration. Without network assistance, the UE may not be aware of the updated configuration and may wait for an indefinite time until it starts detecting the updated configuration. After a small cell is detected, if a UE is capable of supporting dual connectivity, then the HO procedure is not necessary. However, the HO may be needed for UEs that are not capable of supporting dual connectivity.

Regarding carrier selection, the feasible time scales may be different for CA capable UEs and non-CA capable UEs. A serving small cell may configure a newly turned-on CC as a secondary cell for a CA capable UE in order for the CC to serve the UE. However, an intra-eNB HO is needed for a non-CA-capable UE in order for the CC to serve the UE.

For downlink power control, a small change in downlink transmission power may not need to be signalled to the UE, and the communication based on update transmission power may be in effect after a few milliseconds as the transient due to a small power change should be short. However, a large/abrupt change in downlink transmission power may need to be conveyed to the UE. Otherwise, the communications between the eNB and the UE may become unreliable due to the wrong assumption the UE makes about the transmission power. The change may be signalled to the UE based on existing mechanisms such as via paging/system information modification, which may require a few hundreds of milliseconds (ms) at least. It is a common understanding in LTE that the system information modification should not be updated frequently (generally it should not be changed over hours). If a system information modification signaling is sent, the UE needs to re-acquire all system information, which is not an efficient way to implement power adaptation.

According to Table 1, the possible values of the feasible time scales for network adaptation, e.g., using currently existing procedures, can be set as follows: from about 400 ms to about 2000 ms for small cell on/off adaptation, from about 300 ms to about 1200 ms for small cell carrier selection, and from about 10 ms to about 400 ms for small cell downlink power control.

TABLE 1

Feasible time scale examples (unit of time: ms).

| Event/ signaling | Note | On/off w/network assistance | On/off w/o network assistance | Carrier selection | DL power control |
|---|---|---|---|---|---|
| 1 | Adaptation decision sent over backhaul | 0~60 | 0~60 | 0~60 | 0~60 |
| 2 | Small cell sync, turning on RF | 0~100 | | 0~5 | 0 |
| 3 | Small cell transmitting based on updated configuration | ~0 | | ~0 | ~0 |
| 4 | UE cell search gap (not needed w/ network assistance) | 0 | 100~1000 or more | ~0 | ~0 |
| 5 | Network signaling of updated configuration, via e.g. RRC, paging | 100~200 (may be concurrent with step 2) | 0 | 100~200 | 0~300 |
| 6.1 | UE changing RF | 0~10 | | 0~10 | ~0 |
| 6.2 | UE detecting PSS/SSS | 0 | 10~200 | 0~200 | ~0 |
| 6.3 | CRS T/F acquisition | ~10 | | 0~10 | ~0 |
| 6.4 | UE RRM measurement | ~200 | | ~200 | 0~200 (may be concurrent with step 5) |
| 7 | Preparing for new connection (e.g. HO procedure, changing S-cells, changing dual connectivity cells) | 100~600 | | 0~200 | ~0 |
| 8 | RACH procedure | 20~40 | | 20~40 | ~0 |
| 9 | Small cell RRC signaling of UE specific configurations | 100~200 | | 0~200 | ~0 |
| 10 | Measurement reports (RRM/CSI) | 10~50 | | 10~50 | 10~50 |
| | Total | 440~1070 | 450~2070 or more | 330~1175 | 10~410 |

Figure 14:
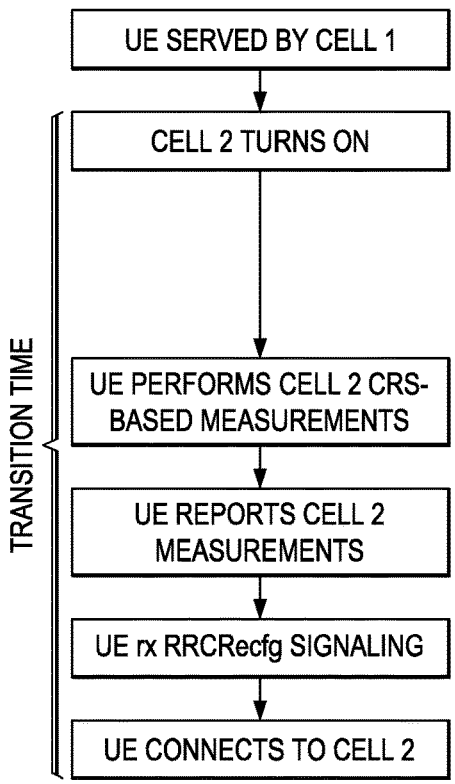

FIG. 14 shows a typical scenario for a UE to connect to a cell that turns on. The UE is first served by a first cell, e.g., by a macro point. When a second cell, e.g., a small cell, close to the UE turns on, the UE performs CRS-based measurements for the second cell, and reports the measurements to the network. After receiving the RRC reconfiguration information, the UE connects to the second cell. In this scenario, there may be a considerable time delay between the instance the second cell turns on and the instance the UE performs the CRS based measurements for the second cell. This may be due, for example, to the UE cell search time and detecting necessary signaling from the second cell. The long delay is not desirable, as it implies that a turned on cell has to wait for a long time to serve a UE. Thus, there is a need for schemes for small cell on/off adaptation that reduce the transition time for the UE to connect to the small cell (e.g., a pico point) that switches on.

Figure 15:
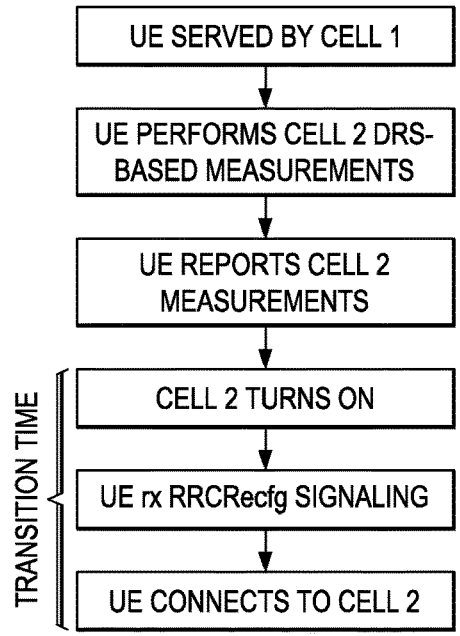
FIG. 15 is a diagram that illustrates an embodiment method for small cell on/off adaptation with reduced transmission time.

FIG. 15 shows an embodiment method for small cell on/off adaptation with reduced transition time. When the UE is served by a first cell, the UE can perform downlink measurements based on a second cell turned-off cell discovery reference signal (DRS) or other DL reference signal transmissions. When turned off, the second cell can still send DL reference signals such as DRS for surrounding UEs to detect. Thus, when the UE is in the coverage area of the small cell and detects the DRS, the UE performs measurements accordingly and reports the measurements (DRS based RRM measurements (RSRP/RSRQ)) to the network. The second cell is then turned on, e.g., via signaling by the network, and the UE receives RRC reconfiguration signaling. The UE then connects to the second cell according to the reconfiguration. This method reduces the transition time between switching the second cell on and connecting to the second cell in comparison to the typical scenario of FIG. 14. Specifically, allowing the small cell to continue sending DRS signals when turned off promotes faster detection of the small cell by the UE and avoids long delay due to performing the CRS-based RRM measurement required by the specification, which takes at least 200 ms. Further, when the network receives the measurement reports from the UE, the network may configure UE-specific information for the UE directly and save additional configuration steps, reducing the transition time.

Figure 16:
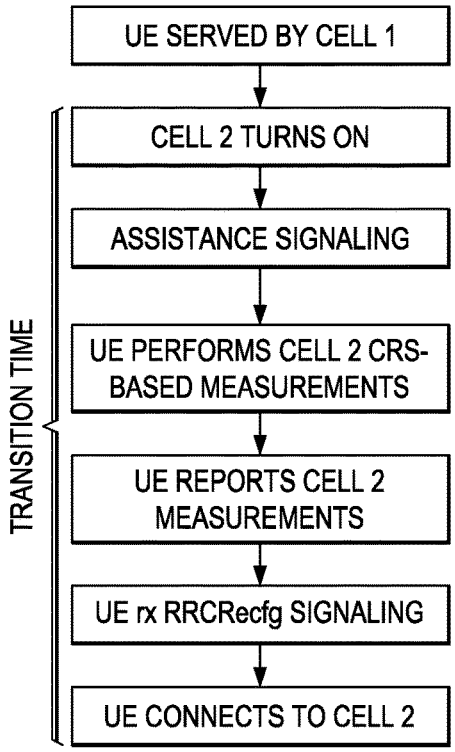
FIG. 16 is a diagram that illustrates another embodiment method for small cell on/off adaptation with reduced transmission time.

FIG. 16 shows another embodiment method for small cell on/off adaptation with reduced transition time using network assistance. When the UE is served by a first cell and a second cell, e.g., a small cell, within proximity of the UE turns on, the network performs signaling to assist the UE to connect to the second cell. The network signaling informs the UE of the presence of an activated small cell within range. Hence, the UE detects the second cell (based on the second cell's CRS and/or DRS) and performs measurements accordingly, and then reports the measurements to the network. The UE then receives RRC reconfiguration signaling and connects to the second cell accordingly. This method reduces the transition time between switching the second cell on and connecting to the second cell in comparison to the typical scenario of FIG. 14. Specifically, the network assistance signaling by the network allows the UE to detect the second cell and hence perform and report the necessary measurements with reduced delay.

The network assistance signaling may be sent to the UE from a network node that the UE is connected to, such as the first cell. The purpose of such a signaling is to inform the UE that a change of the network configuration is expected/ undergoing or has occurred. Thus the UE's cell search gap in step 4 of FIG. 13 and Table 1 and between steps 2 and 3 in FIG. 14 may be reduced significantly. Without such a signaling, a UE may not necessarily perform a cell search if it does not experience any problem with its current connections, and hence the updated network configuration may be unnoticed by close UEs and cannot provide the desired benefit by serving such UEs.

For example, as the traffic load increases gradually, the network decides to turn on one or more small cells to increase the capacity of the network and offload the current serving cells. However, after the small cells are turned, the UEs may not notice any radio link issues/changes so they may not be triggered to perform any cell search. In such a case, the turned-on cells may not contribute any system benefits but increase the interference level in the network, which is not desirable.

The network assistance signaling may be sent to UEs so that the UEs may start a cell search upon receiving such signaling and perform measurements. The signaling may be an existing RRC signaling that modifies an RRC connection (e.g., via RRCConnectionReconfiguration signaling which includes measConfig to reconfigure measurements, or updating the threshold and hysteresis parameters used in measurement events so that a measurement event is more likely to be triggered). This may work in cases where the network has sufficient information regarding the relative locations/ channel qualities of the UEs and the turned-on small cells, or where the network may reconfigure the UEs so that they can monitor certain small cells that are just turned on. In an embodiment, the cell IDs of the turned-on small cells and relevant information may be carried in the reconfiguration signal, and hence the UE may not need to perform any blind cell search. The UE can just detect the PSS/SSS/PBCH of the associated cell and acquire system information, reducing the feasible time scale significantly. This may be done by configuring the UE with a measurement object regarding the turned-on small cell, and/or updating the neighbor list of the UE.

In other possible implementations, the network does not signal information about the turned-on small cells to the UEs, but instead notifies the UEs that a change is occurring. Hence, the UEs may start to perform a cell search. When a UE receives such a reconfiguration signal, it may reset its measurement filters (e.g., filters involving interference measurements and RSSI measurements) associated with some measurement processes or specified measurement processes. The UE may also start intra-frequency and/or inter-frequency cell search. In various embodiments, the reconfiguration signaling comprises any combination of a time stamp for resetting a measurement process, a time stamp for starting intra-frequency and/or inter-frequency cell search, an indicator of whether or not to perform intra-frequency and/or inter-frequency cell search, an indicator of whether or not to perform measurement reset, and other relevant information.

In some implementations, the reconfiguration signals may also be used for other purposes such as probing. The signals used for probing (or other purposes) may be separated from the signals used for assisting the UEs to search for new small cells or identify new network configurations. The signal for triggering a cell search may be UE specific high layer signaling (e.g., RRC), physical layer signaling (e.g. in PDCCH/EPDCCH), or in common channels.

The HO procedure may follow the UE's detection of new small cells, which may typically take several hundreds of milliseconds. However in some cases, the HO procedure is not needed and is not used, and hence the transition time is further reduced. For example, if the UE can support dual connectivity or multi-cell access, the UE may be configured to add/modify a connection. In another example, if the turned-on cell is a CC of the UE's serving cell, the serving cell may configure the turned-on CC as a secondary cell of the UE without any HO if the UE supports CA, or the serving cell may initiate an intra-eNB HO across the CCs which can also reduce the time scales. Alternatively, the eNB may send Scell activation/deactivation signaling via MAC signaling, which is faster than HO and Scell addition/removal.

Other embodiments for small cell on/off adaptation include UL-signal based schemes and DL-signal based techniques. In UL-signal based schemes, small cells monitor the uplink, such as RACH, SRS, or modifications of existing signals. In DL-signal based schemes, the network decides to turn on certain DL channels, e.g., DL reference signals for UE measurements, based on mechanisms such as periodic DL reference signal transmissions (e.g., DRS), using load/location information sent from some network entities as a trigger (e.g., wake-up signal), or using UL signals as a trigger. The UL-signal based schemes may not be sufficient as DL measurements may be needed for the network to make better transition decisions. Some DL-signal based schemes may use a UL signal as the wake-up signal. The DL reference signals for UE measurements may be triggered by an UL signal from UEs. New downlink signaling may also be used to enable the network to alert UEs in proximity of its presence and trigger the transmission of a wake-up signal.

With regard to power control, the network typically convey transmission power changes to UEs using procedures such as paging, e.g., with systeminfomodification. However, the paging and receiving of system information in return may take at least several hundreds of milliseconds. Another way to notify the UEs about power changes is via secondary cell reconfiguration or via mobility control, which may not be applicable in all power control scenarios. A new signaling scheme for carrying cell power change information with reduced transition time is desirable.

Figure 17:
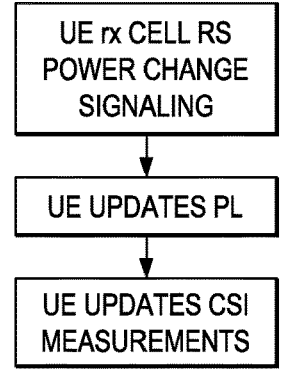
FIG. 17 is a diagram that illustrates an embodiment method for transmission power adaptation with reduced transmission time.
Figure 18:
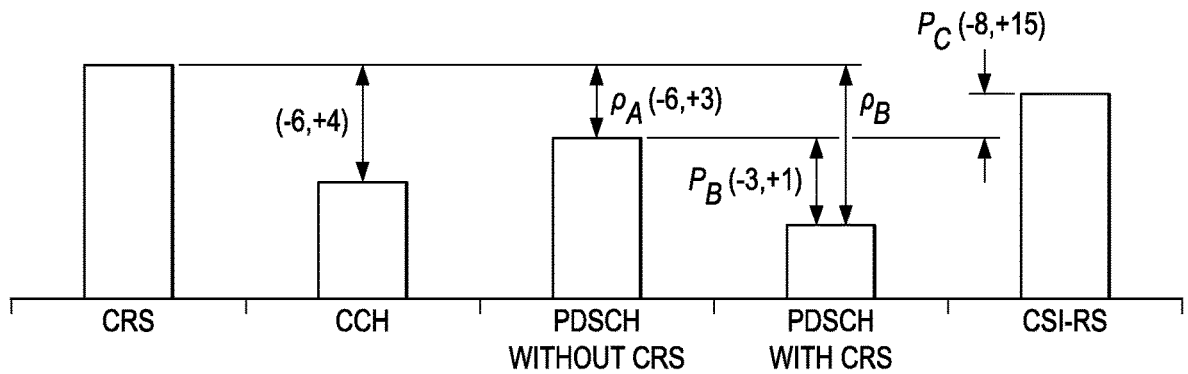
FIG. 18 illustrates a relation between power levels of different signals.

FIG. 17 shows an embodiment for transmission power adaptation with reduced transition time. A specific signaling is used to notify a UE that a cell transmission power (or cell-specific RS transmission power) is changed by a value in dB. The signaling may be a UE specific high layer signaling (e.g., RRC), physical layer signaling (e.g., in PDCCH/EPDCCH), or in common channels. Upon receiving the signal, the UE updates its path loss estimate, which may (or may not) affect the UE's uplink transmission power (due to the existence of closed-loop uplink power control) and compensate its CSI measurements based on the relations of the power levels between the RS power and the EPRE ratio that the UE should assume in generating CSI measurement report. FIG. 18 illustrates the relation between power levels of different signals. Generally, the CRS power is signaled in the system information and/or RRC configuration. This power level may be subject to power adaptation. The control channel (CCH) power is relative to the CRS power within the range of (−6, +4) dB. The PDSCH power is relative to the CRS power and the ratio is signaled as the values $\rho_A$ or $\rho_B$, where the value $p_A$ is used on OFDM symbols without CRS and $\rho_B$ is used on OFDM symbols with CRS. The CSI-RS power is relative to the PDSCH power without CRS, and the ratio Pc is the assumed ratio of PDSCH EPRE to CSI-RS EPRE when UE derives CSI feedback and takes values in the range of [−8, 15] dB with 1 dB step size, where the PDSCH EPRE corresponds to the symbols for which the ratio of the PDSCH EPRE to the cell-specific RS (CRS) EPRE is the value $\rho_A$. Therefore, if the CRS power undergoes an adaptation, the UE should accordingly update its CCH power, PDSCH power, CSI-RS assumed power, and hence the CSI measurement report is also be updated to reflect the power change. The power may be used to offset the UE's measurement results, and the UE may need to recomputed its CSI, including RI, PMI, and precoded CQI and MCS level accordingly. The UE's pathloss estimate is based on CRS measurement, so the pathloss estimate needs to be updated to reflect the power change. Otherwise, the UE would send UL signals based on outdated pathloss estimate, which may be too high (causing high interference) or too low (unable to be decoded by the eNB). The power change can be used to offset the UE's pathloss estimate and hence the UL transmission power.

Other potential issues for network adaptation include the coverage issue if a small cell or a CC is allowed to be turned off or reduce its (common channel transmission) power. However, if a coverage layer is used, such as a macro layer, the coverage issue can be resolved by relying on the coverage layer. Furthermore, idle UEs can also be supported if they are camped on the coverage layer, which can be allowed in the current cell selection mechanism. Therefore, network coverage and idle UE support can be ensured if a coverage layer (e.g., macro layer) exists. To prevent a UE form camping under a small cell performing on/off, the small cell may be blacklisted.

Figure 19:
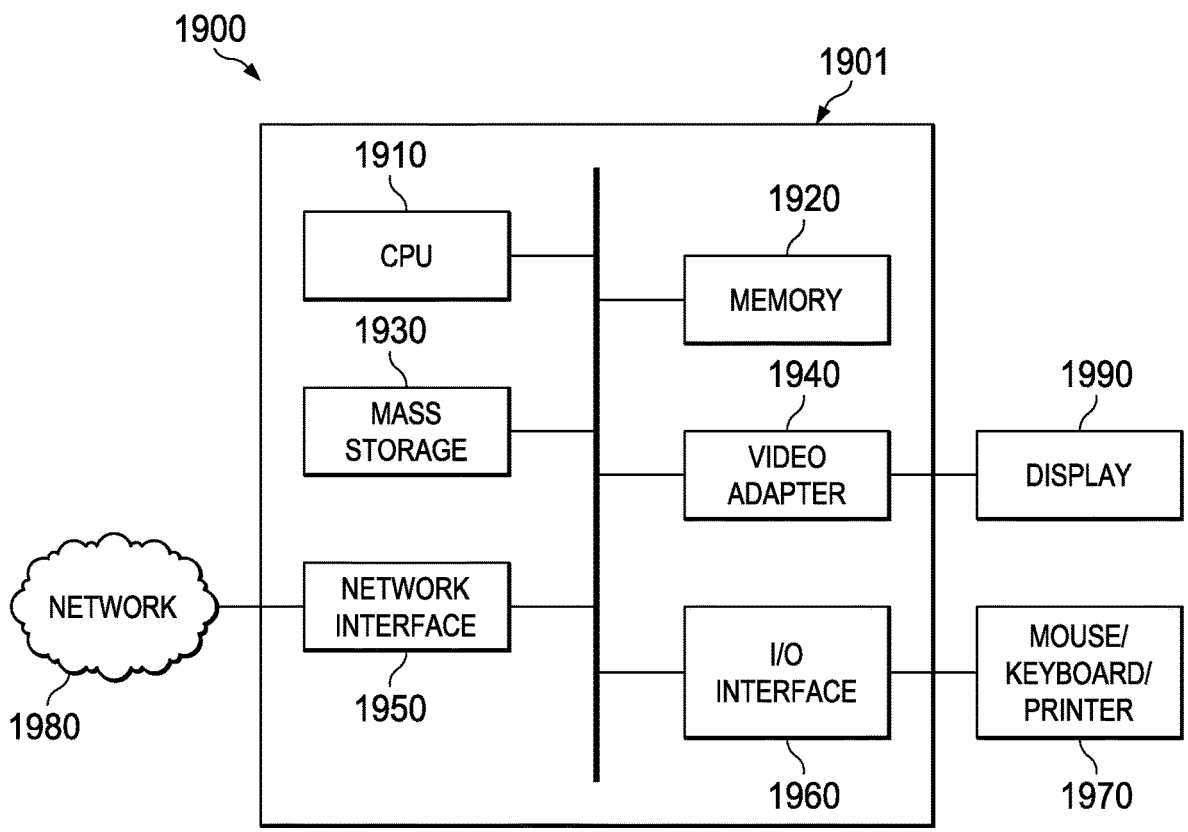
FIG. 19 is a diagram of a processing system that can be used to implement various embodiments.

FIG. 19 is a block diagram of a processing system 1900 that can be used to implement various embodiments. For instance the processing system 1900 can be part of a UE, an eNB, a low power node, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1900 may comprise a processing unit 1901 equipped with one or more input/output devices, such as a speaker, microphone, mouse, touchscreen, keypad, keyboard, printer, display, and the like. The processing unit 1901 may include a central processing unit (CPU) 1910, a memory 1920, a mass storage device 1930, a video adapter 1940, and an I/O interface 1960 connected to a bus. The bus may be one or more of any type of several bus architectures including a memory bus or memory controller, a peripheral bus, a video bus, or the like.

The CPU 1910 may comprise any type of electronic data processor. The memory 1920 may comprise any type of system memory such as static random access memory (SRAM), dynamic random access memory (DRAM), synchronous DRAM (SDRAM), read-only memory (ROM), a combination thereof, or the like. In an embodiment, the memory 1920 may include ROM for use at boot-up, and DRAM for program and data storage for use while executing programs. In embodiments, the memory 1920 is non-transitory. The mass storage device 1930 may comprise any type of storage device configured to store data, programs, and other information and to make the data, programs, and other information accessible via the bus. The mass storage device 1930 may comprise, for example, one or more of a solid state drive, hard disk drive, a magnetic disk drive, an optical disk drive, or the like.

The video adapter 1940 and the I/O interface 1960 provide interfaces to couple external input and output devices to the processing unit. As illustrated, examples of input and output devices include a display 1990 coupled to the video adapter 1940 and any combination of mouse/keyboard/printer 1970 coupled to the I/O interface 1960.

Other devices may be coupled to the processing unit 1901, and additional or fewer interface cards may be utilized. For example, a serial interface card (not shown) may be used to provide a serial interface for a printer.

The processing unit 1901 also includes one or more network interfaces 1950, which may comprise wired links, such as an Ethernet cable or the like, and/or wireless links to access nodes or one or more networks 1980. The network interface 1950 allows the processing unit 1901 to communicate with remote units via the networks 1980. For example, the network interface 1950 may provide wireless communication via one or more transmitters/transmit antennas and one or more receivers/receive antennas. In an embodiment, the processing unit 1901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    receiving, by a user equipment (UE), network assistance signaling from a first network controller about a second network controller, wherein the first network controller is connected to the UE, and wherein the second network controller is in a switched-off transmission mode;
    receiving, by the UE, a discovery reference signal (DRS) from the second network controller;
    performing, by the UE, radio resource management (RRM) measurements according to the DRS;
    reporting, by the UE, the RRM measurements to the first network controller;
    receiving, at the UE, a radio resource control (RRC) signaling from the first network controller based on the RRM measurements, the RRC signaling including configuration information allowing a connection between the UE and the second network controller;
    connecting the UE to the second network controller in accordance with the configuration information; and
    receiving, by the UE, at least one of a primary synchronization signal (PSS), a secondary synchronization signal (SSS), a physical broadcast channel (PBCH), or a common/cell-specific reference signal (CRS) from the second network controller after the second network controller is transitioned into an active transmission mode and connected to the UE, a time period between the network assistance signaling and at least one of the PSS, the SSS, the PBCH, or the CRS being less than or equal to 210 ms,
    wherein the second network controller does not transmit any signals over an air interface except the DRS when switched off.

2. The method of claim 1, further comprising:
    receiving, at the UE, a signaling from a network, the signaling indicating a change in transmission power of the DRS associated with the UE; and
    updating a path loss parameter at the UE in accordance with the change in transmission power.

3. The method of claim 2, further comprising:
    modifying a power level of transmission at the UE according to the updated path loss parameter; and
    compensating for channel status indicator reference signal (CSI-RS) based measurements at the UE according to the updated path loss parameter.

4. The method of claim 1, further comprising performing a handover procedure from the first network controller to the second network controller upon connecting the UE to the second network controller.

5. The method of claim 1, wherein the second network controller is a small cell, and wherein the first network controller is one of a macro cell or a second small cell.

6. A user equipment (UE) comprising:
    at least one processor; and
    a non-transitory computer readable storage medium storing programming for execution by the at least one processor, the programming including instructions to:
        receive network assistance signaling from a first network controller about a second network controller, wherein the first network controller is connected to the UE, and wherein the second network controller is in a switched-off transmission mode;
        receive a downlink reference signal (DRS) from the second network controller;
        perform radio resource management (RRM) measurements according to the DRS;
        report the RRM measurements to the first network controller;
        receive a radio resource control (RRC) signaling from the first network controller based on the RRM measurements, the RRC signaling including configuration information allowing a connection between the UE and the second network controller;
        connect the UE to the second network controller in accordance with the configuration information; and
        receive at least one of a primary synchronization signal (PSS), a secondary synchronization signal (SSS), a physical broadcast channel (PBCH), or a common/cell-specific reference signal (CRS) from the second network controller after the second network controller is transitioned into an active transmission mode and connected to the UE, a time period between the network assistance signaling and at least one of the PSS, the SSS, the PBCH, or the CRS being less than or equal to 210 ms,
        wherein the second network controller does not transmit any signals over an air interface except the DRS when switched off.

7. The UE of claim 6, wherein the programming includes further instructions to:
    detect a signaling from a network, the signaling indicating a change in transmission power of a DRS associated with the UE; and update a path loss parameter at the UE in accordance with the change in transmission power.

8. The UE of claim 7, wherein the programming includes further instructions to:
   modify a power level of transmission at the UE according to the updated path loss parameter; and
   compensate for channel status indicator reference signal (CSI-RS) based measurements at the UE according to the updated path loss parameter.

9. The UE of claim 6, wherein the RRM measurements including at least one of a reference signal received power (RSRP) or a reference signal received quality (RSRQ).

10. A method comprising:
   sending, by a first network controller, network assistance signaling about a second network controller in a switched-off transmission mode to a user equipment (UE), wherein the first network controller is connected to the UE;
   receiving, by the first network controller, a report of a discovery reference signal (DRS) based radio resource management (RRM) measurements from the UE, the DRS based RRM measurements being performed by the UE upon receiving the DRS from the second network controller in the switched-off transmission mode;
   sending, by the first network controller, a radio resource control (RRC) signaling to the UE based on the DRS based RRM measurements, the RRC signaling including configuration information allowing a connection between the UE and the second network controller; and
   sending, by the first network controller, one of a request to turn on transmission at the second network controller or a request to serve the UE by the second network controller to the second network controller so that the UE receives at least one of a primary synchronization signal (PSS), a secondary synchronization signal (SSS), a physical broadcast channel (PBCH), or a common/cell-specific reference signal (CRS) from the second network controller after the second network controller is turned into an active transmission mode and is connected to the UE, a time period between the network assistance signaling and at least one of the PSS, the SSS, the PBCH, or the CRS being less than or equal to 210 ms,
   wherein no signals are transmitted over an air interface except the DRS when in the switched-off transmission mode.

11. The method of claim 10, further comprising sending, by the first network controller to the UE, a signaling indicating a change in transmission power of a reference signal associated with the UE.

12. The method of claim 10, wherein the signaling is one of a radio resource control (RRC) signaling or a physical layer signaling.

13. The method of claim 10, wherein network assistance signaling from the first network controller about the second network controller comprises timing information about the DRS.

14. A first network controller comprising:
   at least one processor; and
   a non-transitory computer readable storage medium storing programming for execution by the at least one processor, the programming including instructions to:
      send network assistance signaling about a second network controller in a switched-off transmission mode to a user equipment (UE), wherein the first network controller is connected to the UE;
      receiving a report of a downlink reference signal (DRS) based radio resource management (RRM) measurements from the UE, the DRS based RRM measurements being performed by the UE upon receiving the DRS from the second network controller in a switched-off transmission mode;
      send a radio resource control (RRC) signaling to the UE based on the DRS based RRM measurements, the RRC signaling including configuration information allowing a connection between the UE and the second network controller; and
      send one of a request to turn on transmission at the second network controller or a request to serve the UE by the second network controller to the second network controller so that the UE receives at least one of a primary synchronization signal (PSS), a secondary synchronization signal (SSS), a physical broadcast channel (PBCH), or a common/cell-specific reference signal (CRS) from the second network controller after the second network controller is turned into an active transmission mode and connected to the UE, a time period between the network assistance signaling and at least one of the PSS, the SSS, the PBCH, or the CRS being less than or equal to 210 ms,
   wherein no signals are transmitted over an air interface except the DRS when in the switched-off transmission mode.

15. The first network controller of claim 14, wherein the programming includes further instructions to send, to the UE, a signaling indicating a transmission power change of a reference signal associated with the UE.

16. The first network controller of claim 15, wherein the signaling is one of a radio resource control (RRC) signaling or a physical layer signaling.

17. The first network controller of claim 14, wherein the first network controller is one of a macro cell or a small cell, and wherein the second network controller is a second small cell.

* * * * *